United States Patent
Sengupta et al.

(10) Patent No.: US 9,731,983 B2
(45) Date of Patent: Aug. 15, 2017

(54) ION EXCHANGE METHODS FOR TREATING WATER HARDNESS

(71) Applicant: LEHIGH UNIVERSITY, Bethlehem, PA (US)

(72) Inventors: Arup K Sengupta, Bethlehem, PA (US); Surapol Padungthon, Bethlehem, PA (US); Michael German, Nottingham, MD (US); Jinze Li, Bethlehem, PA (US)

(73) Assignee: Lehigh University, Bethlehem, PA (US)

( * ) Notice: Subject to any disclaimer, the term of this patent is extended or adjusted under 35 U.S.C. 154(b) by 216 days.

(21) Appl. No.: 14/431,158

(22) PCT Filed: Oct. 4, 2013

(86) PCT No.: PCT/US2013/063468
§ 371 (c)(1),
(2) Date: Mar. 25, 2015

(87) PCT Pub. No.: WO2014/055870
PCT Pub. Date: Apr. 10, 2014

(65) Prior Publication Data
US 2015/0251928 A1    Sep. 10, 2015

Related U.S. Application Data

(60) Provisional application No. 61/709,761, filed on Oct. 4, 2012.

(51) Int. Cl.
*C02F 1/42*    (2006.01)
*B01J 39/20*    (2006.01)
(Continued)

(52) U.S. Cl.
CPC ............... *C02F 1/42* (2013.01); *B01J 39/05* (2017.01); *B01J 39/09* (2017.01); *B01J 39/20* (2013.01);
(Continued)

(58) Field of Classification Search
None
See application file for complete search history.

(56) References Cited

U.S. PATENT DOCUMENTS

| | | | |
|---|---|---|---|
| 6,610,264 B1 * | 8/2003 | Buchanan | B01D 53/04 423/222 |
| 7,967,984 B2 | 6/2011 | Midorikawa et al. | |
| 2010/0006438 A1 | 1/2010 | Antich et al. | |

FOREIGN PATENT DOCUMENTS

| | | | | |
|---|---|---|---|---|
| EP | 0732145 A1 * | 9/1996 | | B01D 53/944 |
| WO | 2009/123683 A2 | 10/2009 | | |

OTHER PUBLICATIONS

"Palygorscite," https://pubchem.ncbi.nlm.nih.gov/compound/56842194 (Mar. 21, 2012).*

(Continued)

*Primary Examiner* — Chester Barry
(74) *Attorney, Agent, or Firm* — Saul Ewing LLP

(57) ABSTRACT

The present invention includes a novel salt-free water softening method that utilizes an exchange medium (such as a gel exchange polymer, a macroporous exchange polymer, or an inorganic cation exchanger) that is pre-loaded with a polyvalent cation that has low solubility in aqueous phase at nearly neutral pH. The method of the invention does not require use of a sodium salt or mineral acid in the regeneration of the exchange medium.

27 Claims, 13 Drawing Sheets

(51) Int. Cl.
*B01J 39/05* (2017.01)
*B01J 39/09* (2017.01)
*B01J 49/06* (2017.01)
*B01J 49/53* (2017.01)
*C02F 101/10* (2006.01)
*C02F 101/14* (2006.01)
*C02F 101/30* (2006.01)
*C02F 103/08* (2006.01)

(52) U.S. Cl.
CPC ............... *B01J 49/06* (2017.01); *B01J 49/53* (2017.01); *C02F 2001/425* (2013.01); *C02F 2101/105* (2013.01); *C02F 2101/14* (2013.01); *C02F 2101/30* (2013.01); *C02F 2103/08* (2013.01); *C02F 2303/16* (2013.01)

(56) References Cited

OTHER PUBLICATIONS

International Search Report, dated Feb. 11, 2014, and Written Opinion issued in International Application No. PCT/US2013/063468.

\* cited by examiner

Figure 2
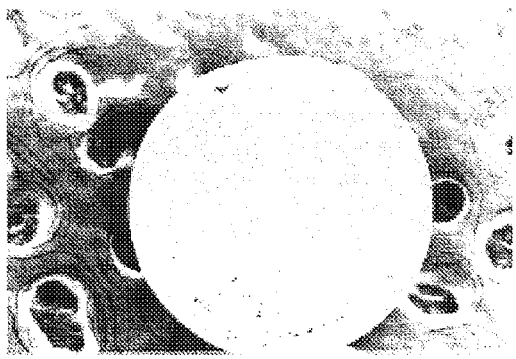
Purolite C-145-Al, Secondary Electron (SE) Mode
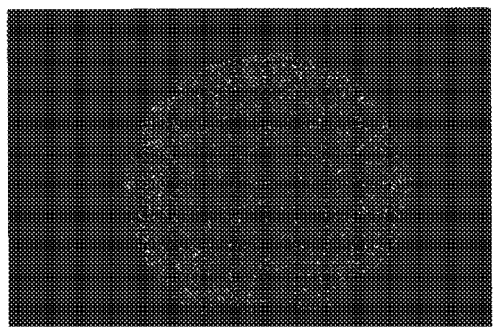
Purolite C-145-Al, Alumunum (Al) EDX
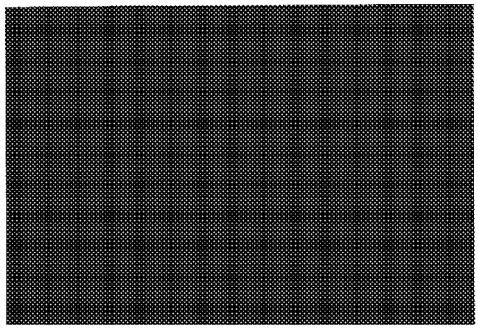
Purolite C-145-Al, Fluoride (F) EDX mapping

ION EXCHANGE METHODS FOR TREATING WATER HARDNESS

The present application is a national stage application of International Application No. PCT/US201/063468, filed on Oct. 4, 2013, which is based on and claims priority to U.S. Provisional Application No. 61/709,761, filed Oct. 4, 2012, the disclosure of each of which is incorporated herein by reference in their entirety.

STATEMENT REGARDING FEDERALLY SPONSORED RESEARCH OR DEVELOPMENT

This invention was made with government support under grant number CBET-1065651 awarded by the National Science Foundation. The government has certain rights in the invention.

FIELD OF THE INVENTION

The invention relates to environmentally friendly methods of removing hardness and other contaminants from a water sample using a cation exchange medium that may be regenerated without the use of a sodium salt or mineral acid.

BACKGROUND OF THE INVENTION

"Hard water" is the term used to describe water with high mineral content. Hardness is generally characterized by a high concentration of multivalent cations, such as the divalent cations $Ca^{2+}$ and $Mg^{2+}$.

Water softening is commonly used to reduce hard water's adverse effects. Hard water can pose serious problems in industrial settings, causing costly breakdowns in boilers, cooling towers, and other equipment that handles water. Many industrial unit operations and unit processes require near-complete removal of hardness to minimize scale in heat transfer equipment, fouling in membranes and use of high concentrations of sequestering chemicals in cooling and wash water. In domestic settings, hard water often results in non-foaming soap water and deposition of lime scale in kettles and water heaters. Households in the central and southwestern U.S., which are generally supplied with ground water, require hardness removal or softening.

Lime softening and traditional cation exchange are the most commonly used processes for hardness removal. Lime softening uses $Ca(OH)_2$ to increase pH, precipitate carbonates, and remove alkalinity. The process is operationally complex and generates large volumes of solid waste. Traditional ion exchange hardness removal processes use a strong acid cation exchanger in sodium form. Calcium, magnesium and other polyvalent cations contributing to the hardness are exchanged on an equivalent basis with sodium in the resin phase. Exhausted resins are typically regenerated with brine solution (10-15% sodium chloride). This process is inefficient, and the requirement of high concentrations of brine solution results in discharge of nearly 60-80% of the brine used.

The recently developed shallow shell technology improves kinetics of the ion exchange regeneration process and reduces brine consumption. However, the traditional cation exchange water softeners still have a salt discharge problem due to unfavorable equilibrium, i.e., 3-8 equivalents of $Na^+$ are required to desorb one equivalent of hardness. Further, $Na^+$ ions that exchange with hardness (i.e., $Ca^{2+}$ or $Mg^{2+}$) are added into treated water at the same equivalent amount to the hardness being exchanged, and this create a problem for people suffering from hypertension. Waste brine solutions from the spent regenerant cause high total dissolved solids (TDS) in aquatic systems, hurting aquatic life and damaging septic systems and water reclamation facilities. In response, California, Texas and Florida have passed laws requiring salt-free regeneration of water softeners.

There is a need in the art for a clean technology that eliminates the use of high concentrations of sodium salts in water softening procedures. Such technology should yield minimal amounts of salt waste and allow for the economical regeneration of the exchange medium.

SUMMARY OF THE INVENTION

The present invention provides a novel water softening method that utilizes an exchange medium such as a gel exchange polymer, macroporous exchange polymer or inorganic cation exchanger, wherein the medium is pre-loaded with a polyvalent cation that is substantially insoluble in aqueous phase at nearly neutral pH. In one embodiment, the method does not require use of a sodium salt or mineral acid in the regeneration of the exchange medium.

In one aspect, the invention includes a method of desalinizing a water sample comprising a divalent cation. In one embodiment, the method comprises contacting the water sample with a cationic exchange medium loaded with a trivalent or tetravalent cation. In another embodiment, the divalent cation displaces the trivalent or tetravalent cation from the exchange medium and is adsorbed onto the exchange medium. In yet another embodiment, an effluent that has a lower concentration of the divalent cation as compared to the water sample thereby is generated.

In another aspect, the invention includes a kit for desalinizing a water sample comprising a divalent cation. In one embodiment, the kit comprises a cationic exchange medium loaded with a trivalent or tetravalent cation; and instructions for use of the exchange medium to desalinize a water sample.

In one embodiment, the divalent cation is at least one selected from the group consisting of $Ca^{2+}$, $Mg^{2+}$, $Sr^{2+}$, and $Ba^{2+}$.

In one embodiment, the trivalent or tetravalent cation forms a substantially insoluble salt in the pH range of about 3.0 to about 12.0. In another embodiment, the trivalent cation is at least one selected from the group consisting of $Al^{3+}$ and $Fe^{3+}$. In yet another embodiment, the tetravalent cation is at least one selected from the group consisting of $Zr^{4+}$ and $Ti^{4+}$.

In one embodiment, the trivalent or tetravalent cation that is displaced from the exchange medium upon adsorption of the divalent cation forms a substantially insoluble salt in or on the exchange resin.

In one embodiment, the cationic exchange medium is at least one selected from the group consisting of a gel exchange polymer, a macroporous exchange polymer, and an inorganic cation exchanger. In another embodiment, the cation exchange medium comprises a macroporous strong acid cation exchange polymer. In yet another embodiment, the polymer comprises a sulfonic acid functional group. In yet another embodiment, the exchange medium is in the form of a packed bed within a column.

In one embodiment, the exchange medium with an adsorbed divalent cation is regenerated into the trivalent or tetravalent cation form by contacting the medium with a salt of the trivalent or tetravalent cation. In another embodiment, the equivalent amount of the salt of the trivalent or tetravalent cation required to regenerate the exchange medium is substantively equal to the equivalent amount of the divalent cation adsorbed onto the exchange medium.

In one embodiment, the flow of the water sample through the exchange medium is controlled by mechanical means. In another embodiment, the flow of the water sample through the exchange medium is controlled by gravity filtration. In yet another embodiment, the effluent is to be used in industrial, human, animal or agricultural activities.

In one embodiment, the effluent has a lower concentration of at least one constituent selected from the group consisting of fluoride ion, phosphate ion, natural organic matter and total dissolved solids, than the water sample. In another embodiment, the pH of the effluent is equal to or lower than the pH of water sample. In one embodiment, the kit further comprises a water soluble salt of the trivalent or tetravalent cation in solid form, or an aqueous solution thereof, for regenerating the exchange medium.

Compositions and methods defined by the invention were isolated or otherwise manufactured in connection with the examples provided below. Other features and advantages of the invention will be apparent from the detailed description and claims.

BRIEF DESCRIPTION OF THE DRAWINGS

The following detailed description of various embodiments of the invention will be better understood when read in conjunction with the appended drawings. For the purpose of illustrating the invention, certain embodiments are shown in the drawings. It should be understood, however, that the invention is not limited to the precise arrangements and instrumentalities of the embodiments shown in the drawings.

FIG. 2 is a set of photographs illustrating the scanning electron microscopy—energy dispersive X-ray spectroscopy (SEM-EDX) elemental mapping of Purolite C-145 in $Al^{3+}$ form after the end of concurrent hardness and fluoride removal and before regeneration. Iridium was present due to sputter coating with iridium gas to prevent charging of a specimen with the electron beam in the SEM microscope.

DETAILED DESCRIPTION OF THE INVENTION

Figure 1:
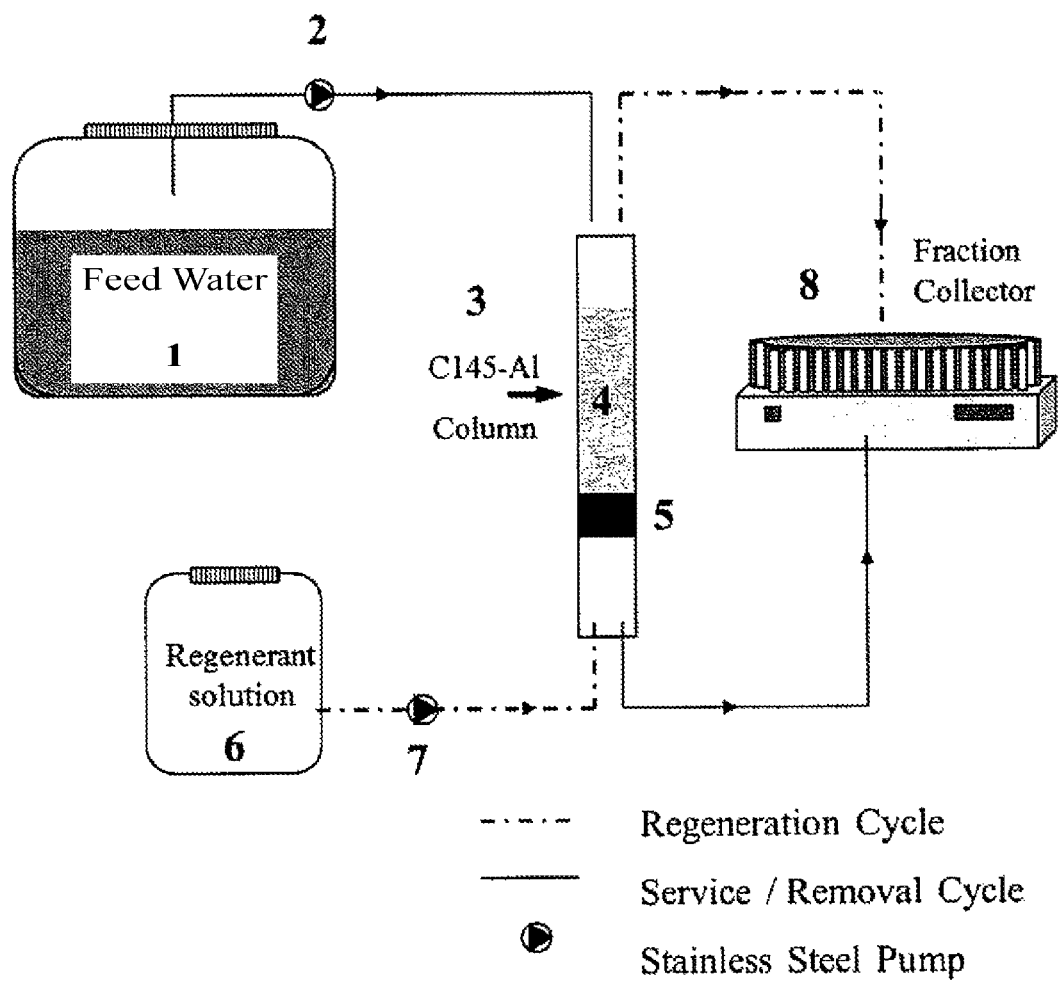
FIG. 1 is a schematic diagram of a setup for a fixed bed column run of cation exchange material in $Al^{3+}$ form and the regeneration process of the material.
Figure 3:
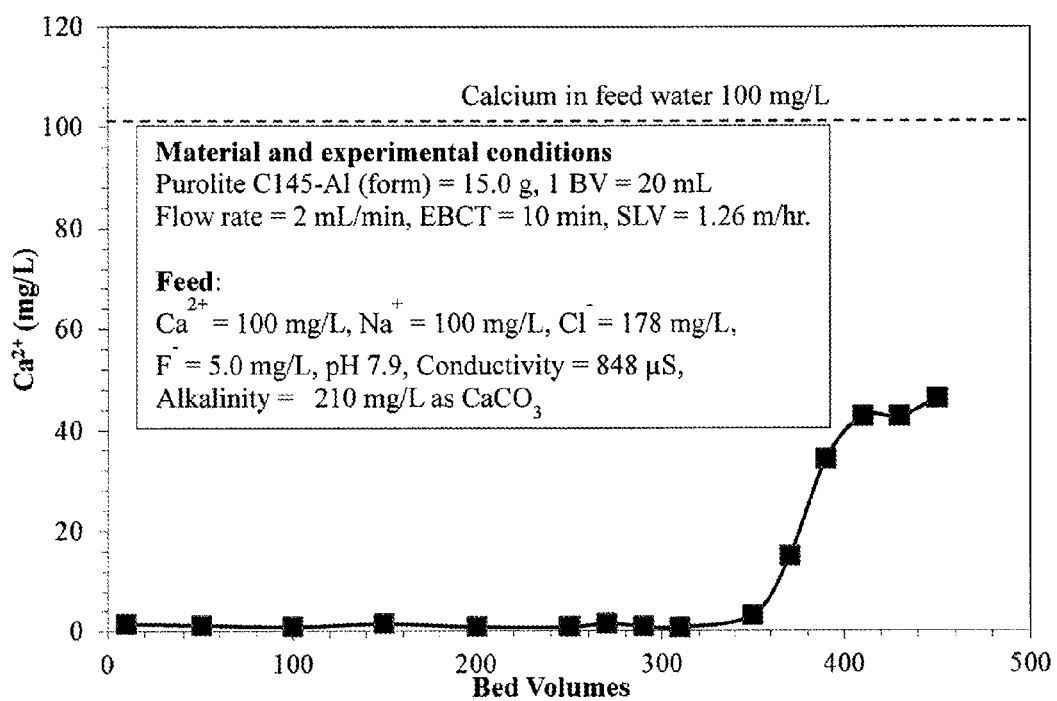
FIG. 3 is a graph illustrating the effluent calcium history for hardness removal with high calcium concentration in feed (100 mg/L) during column runs using a macroporous strong acid cation exchange polymer that started in $Al^{3+}$ form.
Figure 4:
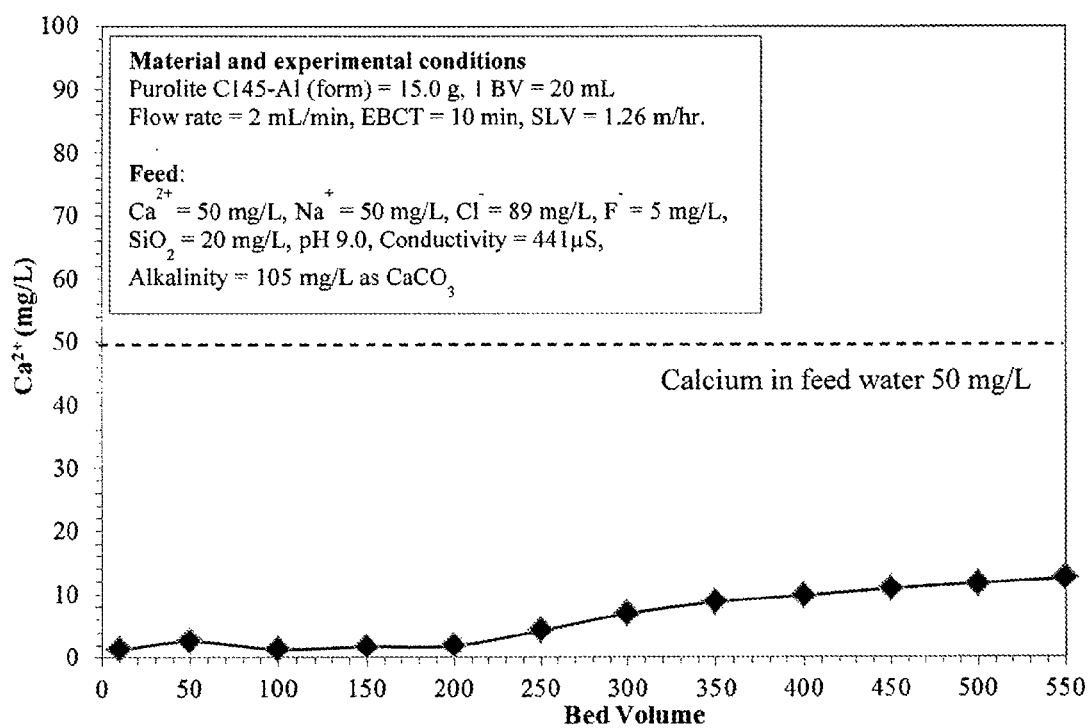
FIG. 4 is a graph illustrating the effluent calcium history for hardness removal with low calcium concentration in the feed (50 mg/L) during column runs using a macroporous strong acid cation exchange polymer that started in $Al^{3+}$ form.
Figure 5:
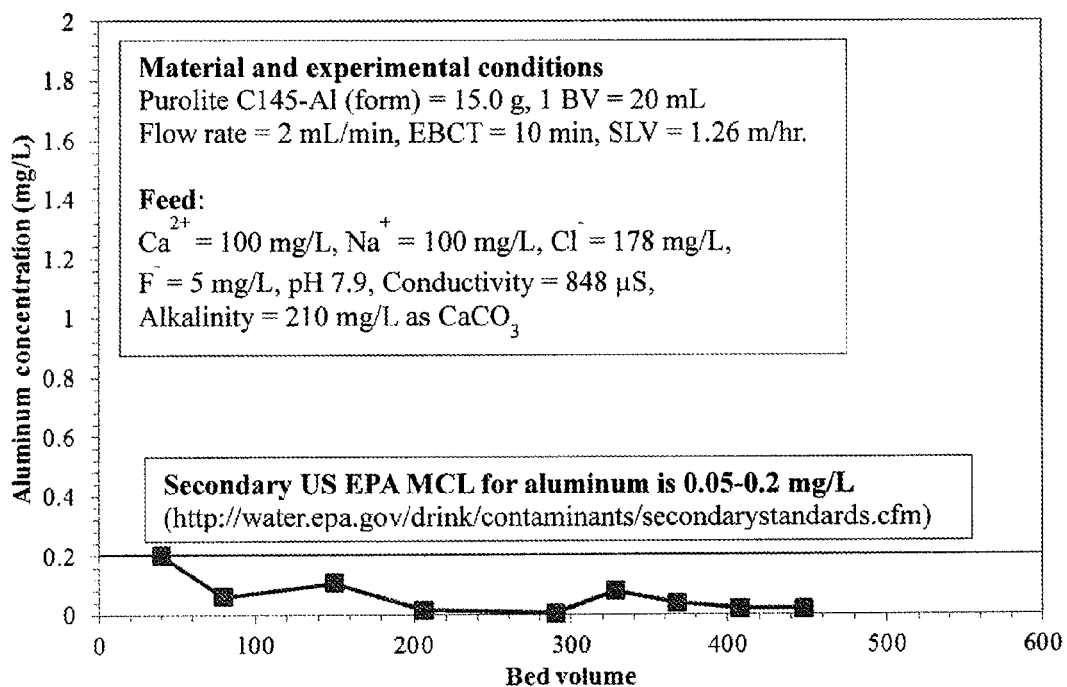
FIG. 5 is a graph illustrating a concentration profile of aluminum in treated water during runs using a macroporous strong acid cation exchange polymer starting in $Al^{3+}$ form.
Figure 6:
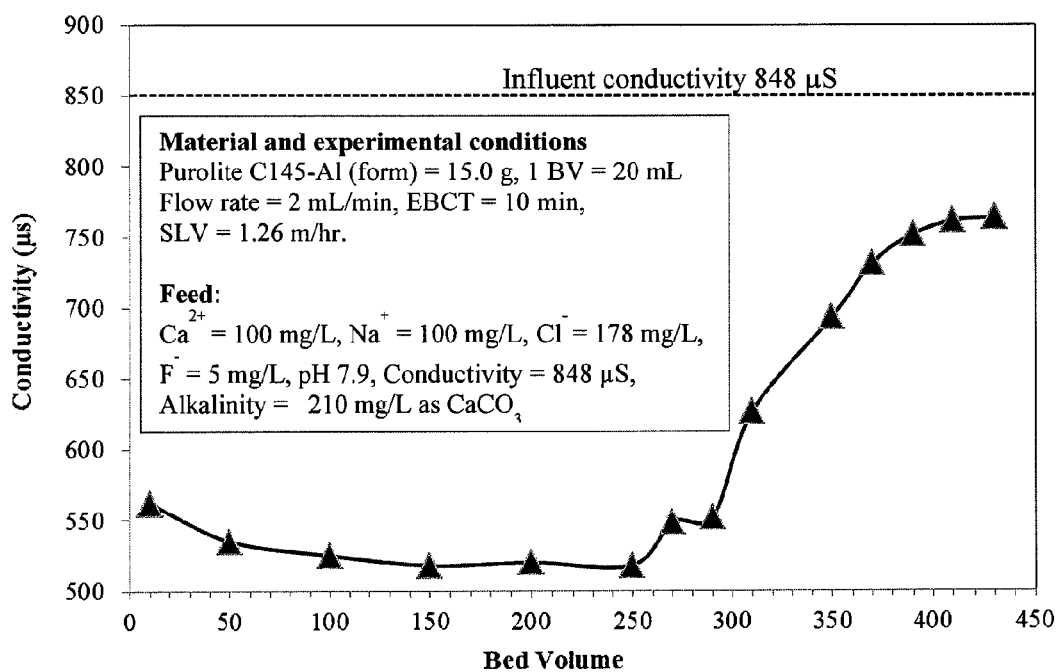
FIG. 6 is a graph illustrating a breakthrough profile of treated water conductivity during column runs using a macroporous strong acid cation exchange polymer starting in $Al^{3+}$ form.
Figure 7:
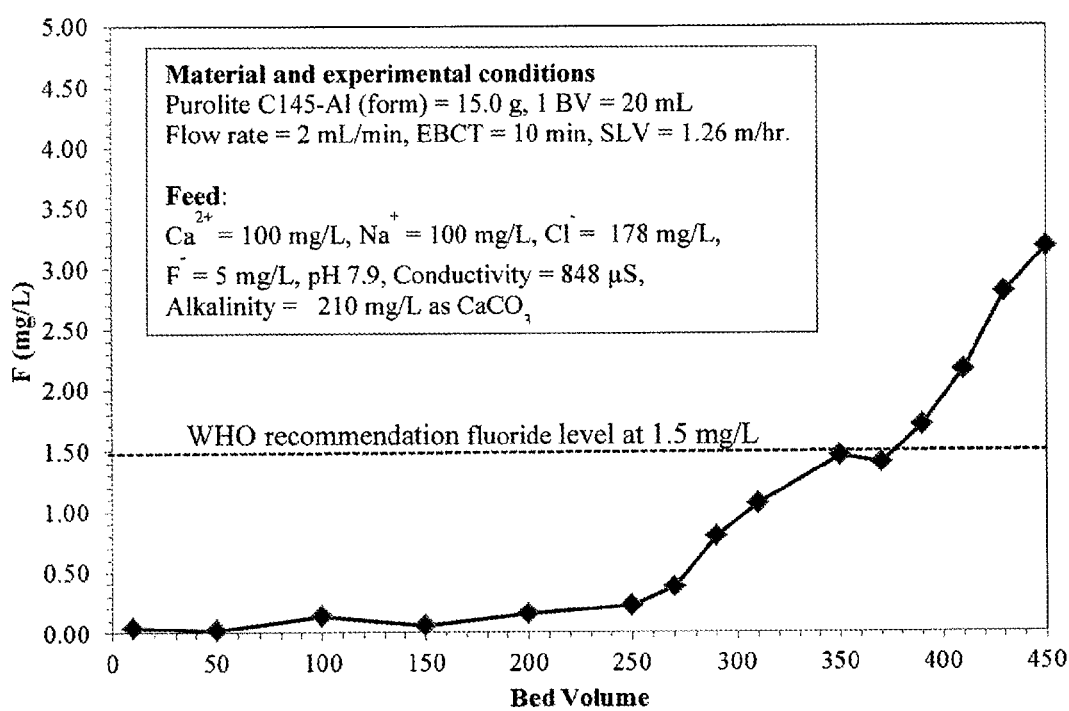
FIG. 7 is a graph illustrating the effluent history of fluoride removal during a column run using a macroporous strong acid cation exchange polymer that started in $Al^{3+}$ form.
Figure 8:
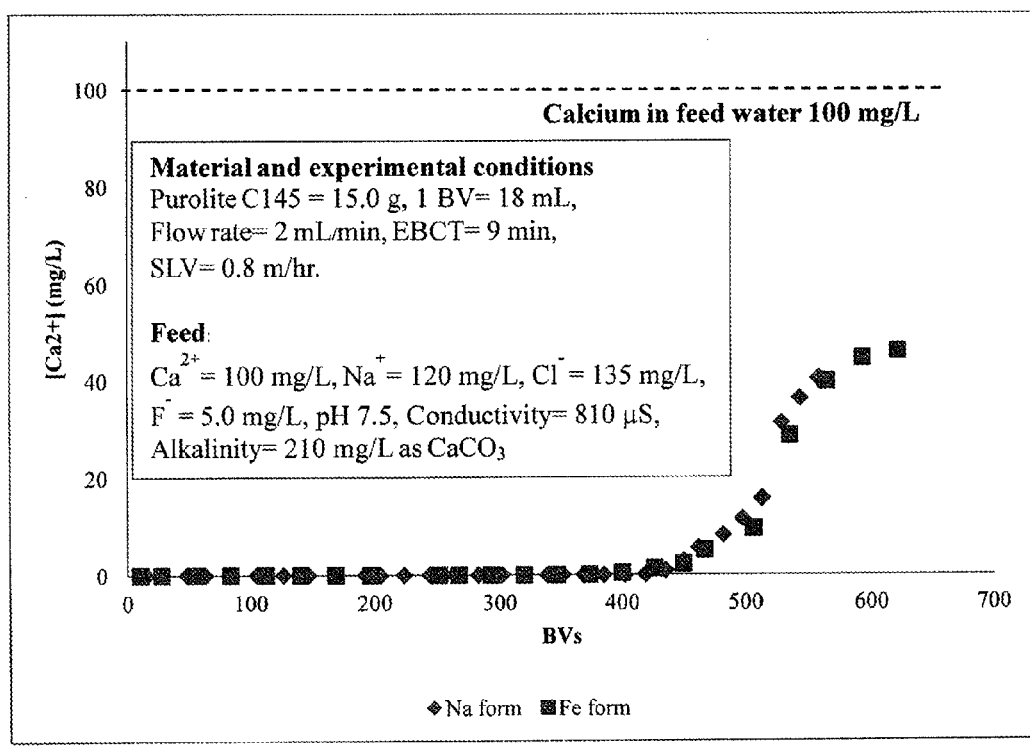
FIG. 8 is a graph illustrating the effluent calcium history for hardness removal with moderate calcium in the feed (100 mg/L) during column runs using a macroporous strong acid cation exchange polymer starting in $Na^+$ and $Fe^{3+}$ form.
Figure 9:
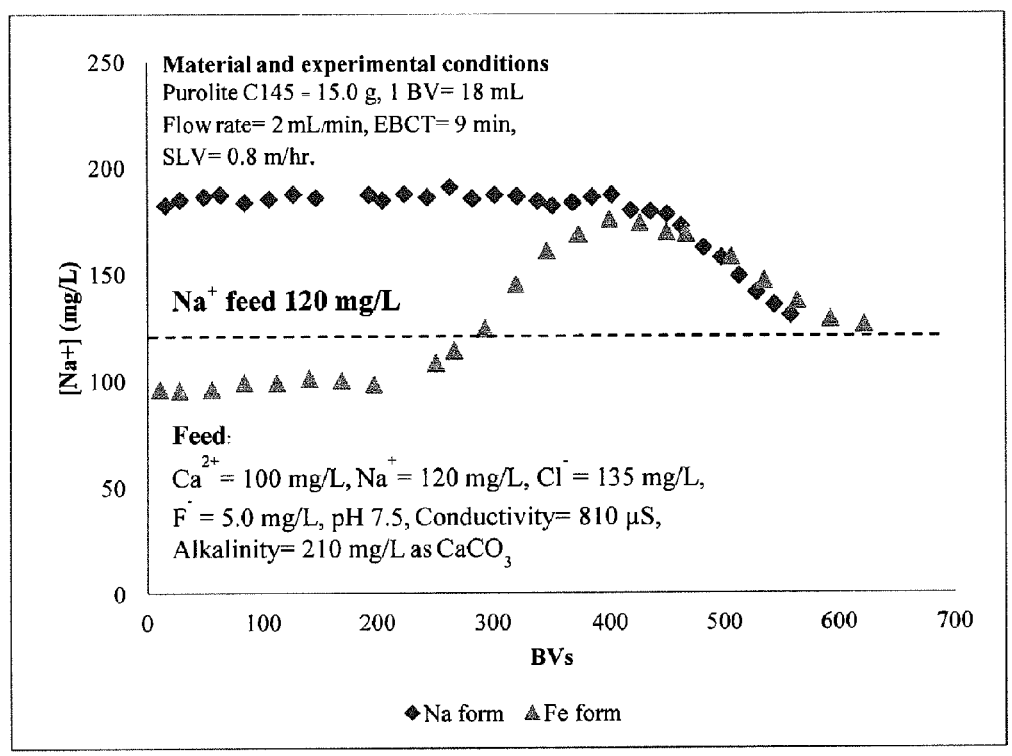
FIG. 9 is a graph illustrating the effluent sodium history for hardness removal with moderate calcium in the feed (100 mg/L) during column runs using a macroporous strong acid cation exchange polymer starting in $Na^+$ and $Fe^{3+}$ form.

The method of the invention allows for the partial or substantially total desalinization (also known as desalination, desalinisation or desalting) of water, i.e., reduction of total dissolved solids (TDS) from water.

The present invention is based, at least in part, on the unexpected discovery of a salt-free water softening method that utilizes a cationic exchange medium (such as, but not limited to, a gel exchange polymer, a macroporous exchange polymer, or an inorganic cation exchanger) that is pre-loaded with a polyvalent cation, wherein the polyvalent cation has low solubility in aqueous phase at nearly neutral pHs. In one embodiment, the polyvalent cation is trivalent or tetravalent. In another embodiment, the tetravalent cation comprises $Zr^{4+}$ or $Ti^{4+}$. In yet another embodiment, the polyvalent cation comprises $Al^{3+}$ or $Fe^{3+}$, both of which form substantially insoluble salts and/or hydroxides in the pH range of about 3.0-12.0. Hardness removal obtained with the method of the invention is at least as efficient and reliable as that obtained with known processes.

In one embodiment, the method of the invention utilizes nearly stoichiometric amounts of the polyvalent cation for regeneration of the cationic exchange medium. As a consequence, as compared to traditional brine or salt regeneration for ion exchange processes, significantly less volume of waste (e.g., brine waste) is formed during regeneration. In fact, the method of the invention requires no use of brine during regeneration, and the disposable waste regenerant comprises virtually no sodium ion. In one embodiment, the spent regenerant consists essentially of salts of hardness (e.g., $Ca^{2+}$ and/or $Mg^{2+}$) removed during the service cycle. Further, no mineral acid is needed for the regeneration of the cationic exchange medium.

In one embodiment, the method allows for selective removal of fluoride, phosphate and other anionic ligands including natural organic matter from water, advantageously when the cationic exchange medium is preloaded with $Al^3$ In one embodiment, the method of the invention contemplates as regenerant a salt (such as but not limited to a chloride or acetate) of a polyvalent cation (such as but not limited to $Zr^{4+}$, $Ti^{4+}$, $Al^{3+}$ or $Fe^{3+}$). Because the exchange medium is not in $Na^+$ form at the start of the service cycle, treated water has lower $Na^+$ content than that for the conventional ion exchange softening process. Further, once ion exchange takes place on the exchange medium (i.e., a hardness cation such as $Ca^{2+}$ or $Mg^{2+}$ displaces the polyvalent cation from the exchange medium), the polyvalent cation immediately precipitates from solution and is not present in the water effluent as a contaminating cation. In one embodiment, the effluent is to be used in industrial, human, animal or agricultural activities.

The cationic exchange medium useful within the methods of the invention is advantageously solid and includes, but is not limited to, a gel exchange polymer (or resin), a macroporous exchange polymer (or resin), or an inorganic cation exchanger. In one embodiment, the exchange medium comprises a macroporous strong acid cation exchange polymer. In another embodiment, the exchange polymer comprises a sulfonic acid functional group. In yet another embodiment, the exchange polymer comprises Purolite C-145. In yet another embodiment, the exchange medium is in the form of a packed bed within a column.

In a non-limiting embodiment, the resin beads may be changed into aluminum form by passing stoichiometric amounts of aluminum salt, such as a solution of alum ($Al_2(SO_4)_3 \cdot 16H_2O$) or aluminum chloride ($AlCl_3 \cdot 6H_2O$), through the exchange medium, as illustrated in reaction (1), wherein (em) indicates the exchange medium:

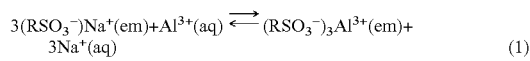

$$3(RSO_3^-)Na^+(em) + Al^{3+}(aq) \rightleftharpoons (RSO_3^-)_3Al^{3+}(em) + 3Na^+(aq) \quad (1)$$

The hardness (i.e., $Ca^{2+}$ or $Mg^{2+}$) in the water is removed by ion exchange with $Al^{3+}$ in the macroporous strong acid cation exchange polymer as illustrated in reaction (2), where $M^{2+}$ is a divalent cation (e.g., $Ca^{2+}$, $Mg^{2+}$, $Sr^{2+}$, $Ba^{2+}$):

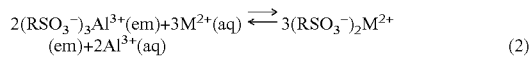

$$2(RSO_3^-)_3Al^{3+}(em) + 3M^{2+}(aq) \rightleftharpoons 3(RSO_3^-)_2M^{2+}(em) + 2Al^{3+}(aq) \quad (2)$$

When released from the cation exchange functional groups, aluminum ions undergo hydrolysis and form aluminum (hydr)oxide [$Al(OH)_3(s)$] particles that precipitate onto the gel and/or within the pore phase of macroporous cation exchange polymer via the following reaction:

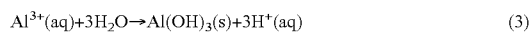

$$Al^{3+}(aq) + 3H_2O \rightarrow Al(OH)_3(s) + 3H^+(aq) \quad (3)$$

Aluminum concentration at the exit of the column is thus very low. As illustrated in equation (3), protons are produced in equation (3), and can then react with alkalinity in water as follows:

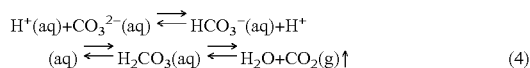

$$H^+(aq) + CO_3^{2-}(aq) \rightleftharpoons HCO_3^-(aq) + H^+(aq) \rightleftharpoons H_2CO_3(aq) \rightleftharpoons H_2O + CO_2(g)\uparrow \quad (4)$$

Thus, both hardness and alkalinity are simultaneously removed concomitantly with the reduction of total dissolved solids (TDS) in water.

The exhausted resins are regenerated by passing nearly stoichiometric amounts of aluminum or other polyvalent cation salts, such as a solution of alum ($Al_2(SO_4)_3 \cdot 16H_2O$) or $AlCl_3$ through the exchange medium, according to the reaction:

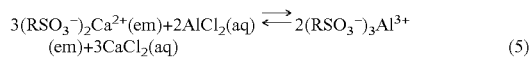

$$3(RSO_3^-)_2Ca^{2+}(em) + 2AlCl_2(aq) \rightleftharpoons 2(RSO_3^-)_3Al^{3+}(em) + 3CaCl_2(aq) \quad (5)$$

In one aspect, the regeneration reaction (5) is the reverse of reaction (2). After the regeneration with $AlCl_3$ solution, the exchange resin is in the polyvalent ion form and ready for the next service cycle of hardness removal.

In one embodiment, the flow of the water sample through the exchange medium is controlled by mechanical means. In another embodiment, the flow of the water sample through the exchange medium is controlled by gravity filtration.

The waste regenerant stream contains $CaCl_2$, where the calcium content is essentially equal to the hardness removed during the previous service cycle. Because the regenerant corresponds to near-stoichiometric requirement, there is practically no excess salt in the regeneration solution Importantly, no excess NaCl is present in the spent regenerant. In one embodiment, the presence of chloride ion can be avoided by using Al(III) and Fe(III) non-chloride salts, such as acetates and citrates.

During the water softening process, along with the desired hardness removal, anionic ligands may be removed from the water through Lewis acid-base interactions with the freshly precipitated polyvalent cation oxides on the matrix and macropores of the cation exchanger. Every cycle of cation exchanger regeneration with polyvalent cations provides a new source for freshly precipitated polyvalent cation oxides that can take part in Lewis acid-base interactions. In one embodiment, the use of $Al^{3+}$-loaded cation exchange resin allows for excellent fluoride (F) removal. In another embodiment, phosphate removal and natural organic matter coagulation are also achieved.

Definitions

Unless defined otherwise, all technical and scientific terms used herein generally have the same meaning as commonly understood by one of ordinary skill in the art to which this invention belongs. Generally, the nomenclature used herein and the laboratory procedures in analytical chemistry and polymer chemistry are those well known and commonly employed in the art.

As used herein, the articles "a" and "an" refer to one or to more than one (i.e. to at least one) of the grammatical object of the article. By way of example, "an element" means one element or more than one element.

As used herein, the term "about" will be understood by persons of ordinary skill in the art and will vary to some extent on the context in which it is used. As used herein when referring to a measurable value such as an amount, a temporal duration, and the like, the term "about" is meant to encompass variations of ±20% or ±10%, more preferably ±5%, even more preferably ±1%, and still more preferably ±0.1% from the specified value, as such variations are appropriate to perform the disclosed methods.

When not otherwise stated, the term "substantially" means "being largely, but not wholly, that which is specified."

As used herein, the term "TDS" refers to totally dissolved solids.

As used herein, the term "strong acid cation exchange polymer" refers to a polymer comprising an acidic group with a pKa value equal to or lower than 3. In one embodiment, the acidic group has a pKa value equal to or lower than 2. In another embodiment, the acidic group has a pKa value equal to or lower than 1. In yet another embodiment, the acidic group has a pKa value equal to or lower than zero. In yet another embodiment, the acidic group has a pKa value equal to or lower than −1 (negative 1). In yet another embodiment, the acidic group comprises a sulfonic acid (—$SO_2OH$) group. One skilled in the art will understand that the strong acid cation exchange polymers useful within the methods of the invention are not limited to those exemplified herein, but rather include all those strong acid cation exchange polymers known in the art and equivalents thereof.

As used herein, the term "instructional material" includes a publication, a recording, a diagram, or any other medium of expression that may be used to communicate the usefulness of the methods of the invention. In some instances, the instructional material may be part of a kit useful for performing the methods of the invention. The instructional material of the kit may, for example, be affixed to a container that contains compositions useful within the methods of the invention or be shipped together with a container that contains such compositions. Alternatively, the instructional material may be shipped separately from the container with the intention that the recipient uses the instructional material and the compositions cooperatively.

Throughout this disclosure, various aspects of the invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

Those skilled in the art will recognize, or be able to ascertain using no more than routine experimentation, numerous equivalents to the specific procedures, embodiments, claims, and examples described herein. Such equivalents are considered to be within the scope of this invention and covered by the claims appended hereto. For example, it should be understood that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

The following examples further illustrate aspects of the present invention. However, they are in no way a limitation of the teachings or disclosure of the present invention as set forth herein.

EXAMPLES

The invention is now described with reference to the following Examples. These Examples are provided for the purpose of illustration only, and the invention is not limited to these Examples, but rather encompasses all variations that are evident as a result of the teachings provided herein.

Example 1

Macroporous strong acid cation exchange polymer with sulfonic acid functional groups from the Purolite Company (Philadelphia, Pa.), namely C-145, was used as the resin material.

Purolite C-145 resin (15 grams, volume approximately 20 mL and shipped in $Na^+$ form—capacity 1.5 meq/mL resin) was packed into a glass column with 11 mm diameter. The resin was changed into aluminum form by passing 1% aluminum chloride solution containing stoichiometric amounts of aluminum ions (2.41 g of $AlCl_3.6H_2O$) in upflow mode followed by rinsing with two bed volumes of deionized water (DI).

The column with C-145 resin in aluminum form was then used for the removal of hardness and anionic ligands from synthetic water. Upon exhaustion, the cation exchange resin loaded with hardness was regenerated with stoichiometric amounts of $Al^{3+}$ using 1% aluminum chloride (2.41 g of $AlCl_3.6H_2O$). For column runs with Purolite C-145 in $Fe^{3+}$ form, $FeCl_3$ solution was used to regenerate the column.

Flame atomic absorption spectroscopy, conductivity meter, SPADNS test, Hach Aluminum test, ion chromatography and pH meter were used to measure sodium, calcium and iron ion concentration; conductivity; fluoride, aluminum and chloride ion concentration; and pH, respectively.

FIG. 1 illustrates the experimental set-up used in the Example.

FIG. 2 illustrates the scanning electron microscopy of the resin in aluminum form after the removal of hardness and before regeneration, confirming the presence of aluminum and fluoride in the matrix of the resin.

FIGS. 3-9 illustrate column run effluent histories, demonstrating removal of hardness and fluoride along with partial desalinization.

Example 2

Two distinct feed compositions were used in the present Example, in order to evaluate the aluminum loaded hybrid ion exchange process. The cation exchange resin used in the study was commercially available Purolite C-145, a strong-acid cation exchange resin from Purolite Co. Other similar resins may also be used within the present invention.

Figure 10:
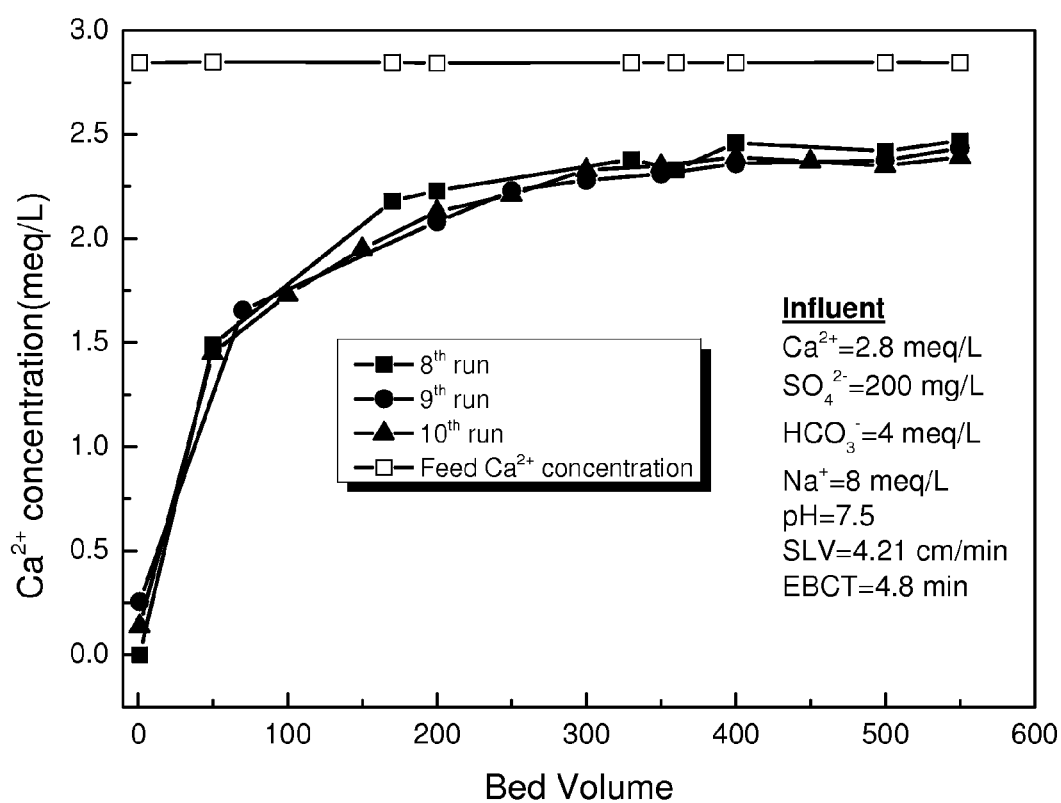
FIG. 10 is a graph illustrating the effluent history of $Ca^{2+}$ during three consecutive column runs under identical operating conditions.
Figure 11:
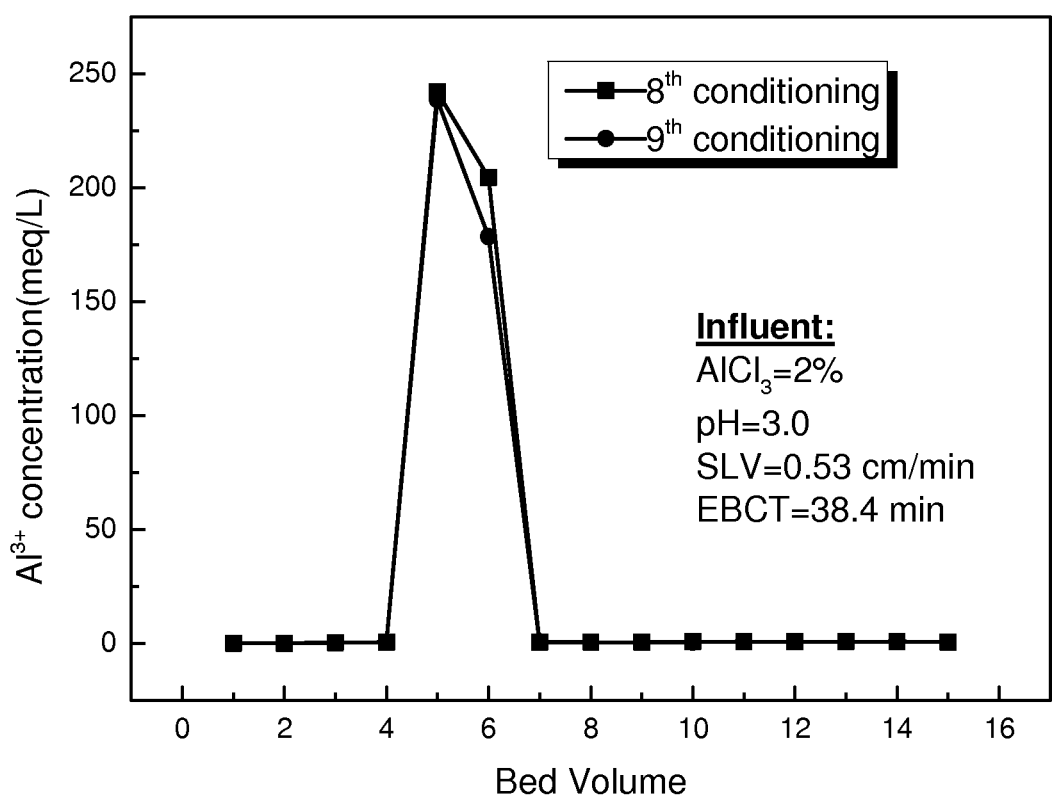
FIG. 11 is a graph illustrating the $Al^{3+}$ history during column conditioning.

First Set:

The influent composition of the feed comprised 2.8 meq/L $Ca^{2+}$, 200 mg/L $SO_4^{2-}$, 4 meq/L $HCO_3^-$, and 8 meq/L $Na^+$. FIG. 10 illustrates calcium effluent histories for three consecutive column runs, and FIG. 11 illustrates the conditioning with aluminum chloride ($AlCl_3$) after each run. According to the mass balance, calcium removed during each column run was 8.6 meq.

The bed was subsequently conditioned with a solution of 2% (w/v) $AlCl_3$ for 4 bed volumes. FIG. 11 illustrates the concentration profile of total $Al^{3+}$ during the conditioning process. The total $Al^{3+}$ added to the bed was about 10.5 meq. Mass balance calculation indicates that 1.2 meq of $Al^{3+}$ was needed to remove 1.0 meq of $Ca^{2+}$.

Figure 12:
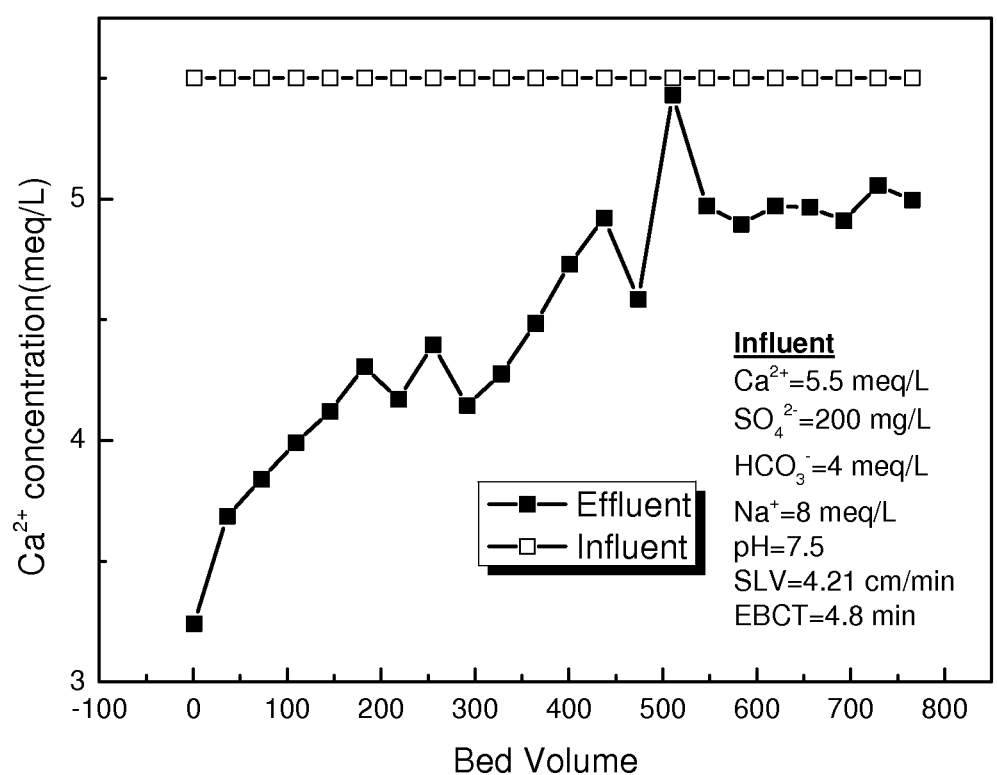
FIG. 12 is a graph illustrating the $Ca^{2+}$ effluent history following conditioning of the strong cation exchange polymer with $AlCl_3$.

Second Set:

In the second set, a much higher concentration of $Ca^{2+}$ (5.5 meq/l) was used in the feed during the column run. The influent composition of the feed comprised 5.5 meq/L $Ca^{2+}$, 200 mg/L $SO_4^{2-}$, 4 meq/L $HCO_3^-$, and 8 meq/L $Na^+$. FIG. 12 illustrates the effluent calcium history. Altogether, 14.4 meq of $Ca^{2+}$ were removed from the system.

Figure 13:
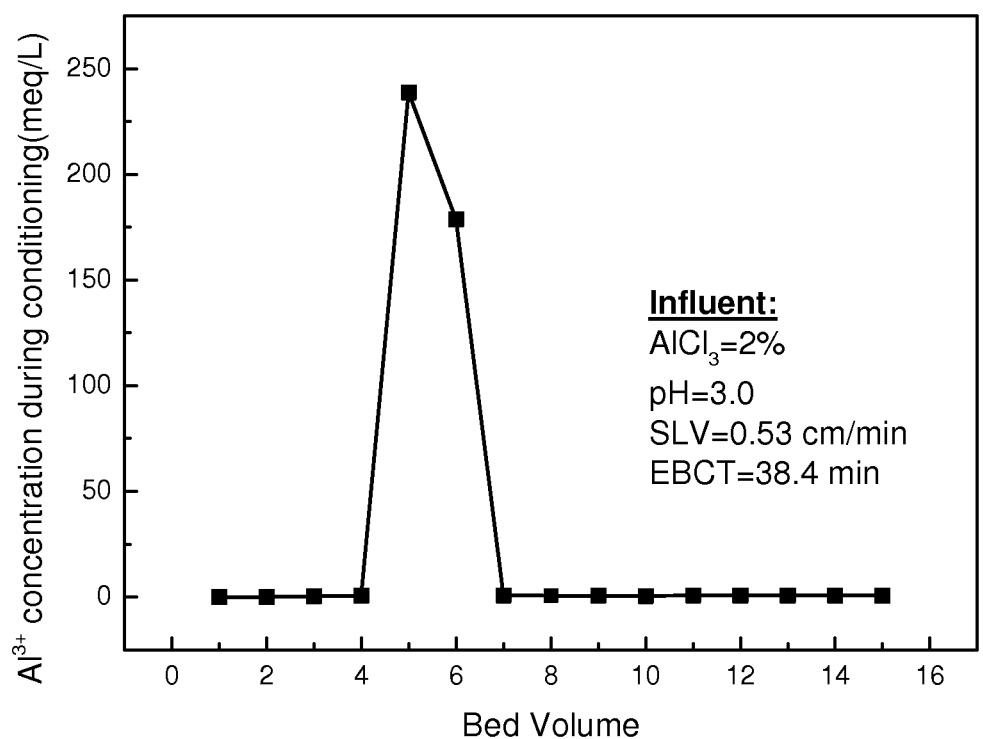
FIG. 13 is a graph illustrating the $Al^{3+}$ history during column conditioning before the $Ca^{2+}$ removal process.

FIG. 13 illustrates the conditioning of the bed with $AlCl_3$ after the run. 10.7 meq of $Al^{3+}$ were needed for this process. From mass balance, approximately 0.75 meq of $Al^{3+}$ was required to remove one meq of $Ca^{2+}$. Spent regenerant thus did not contain any sodium and generated less than stoichiometric amount of calcium removed for disposal.

The disclosures of each and every patent, patent application, and publication cited herein are hereby incorporated herein by reference in their entireties.

Although the invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed:

1. A method of desalinizing a water sample comprising a divalent cation, the method comprising contacting the water sample with a cationic exchange medium loaded with a trivalent or tetravalent cation, wherein the divalent cation displaces the trivalent or tetravalent cation from the exchange medium and is adsorbed onto the exchange medium; and
    wherein the trivalent or tetravalent cation that is displaced from the exchange medium upon adsorption of the divalent cation forms a substantially insoluble salt in or on the exchange medium;
    thereby generating an effluent that has a lower concentration of the divalent cation as compared to the water sample.

2. The method of claim 1, wherein the divalent cation is at least one selected from the group consisting of $Ca^{2+}$, $Mg^{2+}$, $Sr^{2+}$, and $Ba^{2+}$.

3. The method of claim 1, wherein the trivalent or tetravalent cation forms a substantially insoluble salt in the pH range of about 3.0 to about 12.0.

4. The method of claim 3, wherein the trivalent cation is at least one selected from the group consisting of $Al^{3+}$ and $Fe^{3+}$.

5. The method of claim 3, wherein the tetravalent cation is at least one selected from the group consisting of $Zr^{4+}$ and $Ti^{4+}$.

6. The method of claim 1, wherein the cationic exchange medium is at least one selected from the group consisting of a gel exchange polymer, a macroporous exchange polymer, and an inorganic cation exchanger.

7. The method of claim 6, wherein the cation exchange medium comprises a macroporous strong acid cation exchange polymer.

8. The method of claim 7, wherein the polymer comprises a sulfonic acid functional group.

9. The method of claim 1, wherein the exchange medium is in the form of a packed bed within a column.

10. The method of claim 1, wherein the exchange medium with an adsorbed divalent cation is regenerated into the trivalent or tetravalent cation form by contacting the medium with a salt of the trivalent or tetravalent cation.

11. The method of claim 10, wherein the equivalent amount of the salt of the trivalent or tetravalent cation required to regenerate the exchange medium is substantively equal to the equivalent amount of the divalent cation adsorbed onto the exchange medium.

12. The method of claim 1, wherein the flow of the water sample through the exchange medium is controlled by mechanical means.

13. The method of claim 1, wherein the flow of the water sample through the exchange medium is controlled by gravity filtration.

14. The method of claim 1, wherein the effluent is to be used in industrial, human, animal or agricultural activities.

15. The method of claim 1, wherein the effluent has a lower concentration of at least one constituent selected from the group consisting of fluoride ion, phosphate ion, natural organic matter and total dissolved solids, than the water sample.

16. The method of claim 1, wherein the pH of the effluent is equal to or lower than the pH of water sample.

17. A kit for desalinizing a water sample comprising a divalent cation, the kit comprising:
    (a) a cationic exchange medium loaded with a trivalent or tetravalent cation;
    (b) instructions for use of the exchange medium to desalinize a water sample; and
    (c) a water soluble salt of the trivalent or tetravalent cation in solid form, or an aqueous solution thereof, for regenerating the exchange medium.

18. The kit of claim 17, wherein the exchange medium is at least one selected from the group consisting of a gel exchange polymer, a macroporous exchange polymer, and an inorganic cation exchanger.

19. The kit of claim 17, wherein the trivalent cation is at least one selected from the group consisting of $Al^{3+}$ and $Fe^{3+}$.

20. The kit of claim 17, wherein the tetravalent cation is at least one selected from the group consisting of $Zr^{4+}$ and $Ti^{4+}$.

21. The method of claim 10, wherein the exchange medium with an adsorbed divalent cation is regenerated without the use of sodium salts.

22. The method of claim 10, wherein the exchange medium with an adsorbed divalent cation is regenerated without the use of mineral acids.

23. A method of desalinizing a water sample comprising a divalent cation, the method comprising contacting the water sample with a cationic exchange medium loaded with a trivalent or tetravalent cation, wherein the divalent cation displaces the trivalent or tetravalent cation from the exchange medium and is adsorbed onto the exchange medium;
    thereby generating an effluent that has a lower concentration of the divalent cation as compared to the water sample;
    wherein the divalent cation is at least one selected from the group consisting of $Ca^{2+}$, $Mg^{2+}$, $Sr^{2+}$, and $Ba^{2+}$.

24. The method of claim 23, wherein the trivalent or tetravalent cation forms a substantially insoluble salt in the pH range of about 3.0 to about 12.0.

25. The method of claim 24, wherein the trivalent or tetravalent cation is at least one selected from the group consisting of $Al^{3+}$, $Fe^{3+}$, $Zr^{4+}$ and $Ti^{4+}$.

26. The method of claim 23, wherein the cationic exchange medium is at least one selected from the group consisting of a gel exchange polymer, a macroporous exchange polymer, and an inorganic cation exchanger.

27. The method of claim 23, wherein the exchange medium with an adsorbed divalent cation is regenerated into the trivalent or tetravalent cation form by contacting the medium with a salt of the trivalent or tetravalent cation.

\* \* \* \* \*